Figure 2:
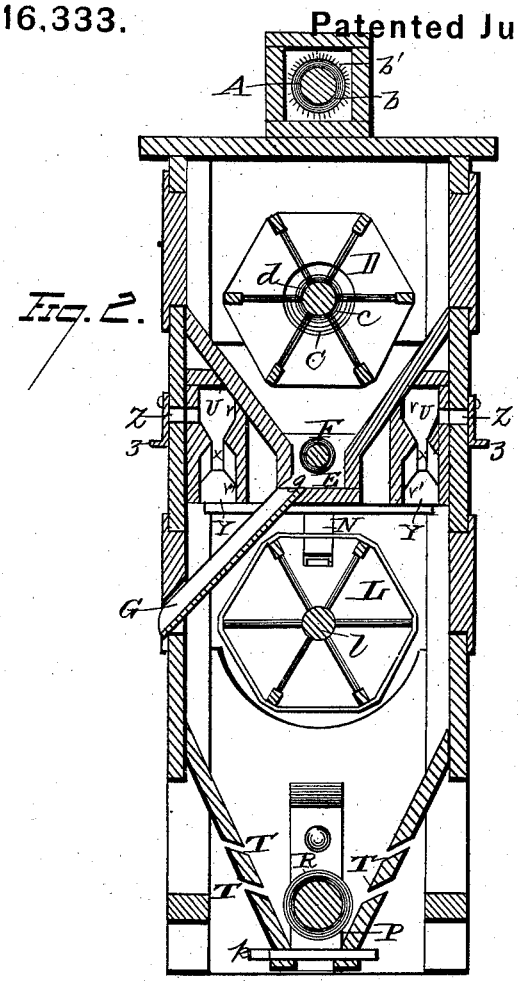

2 Sheets—Sheet 1.
C. F. KELLER.
Middlings Separator.
No. 216,333. Patented June 10, 1879.
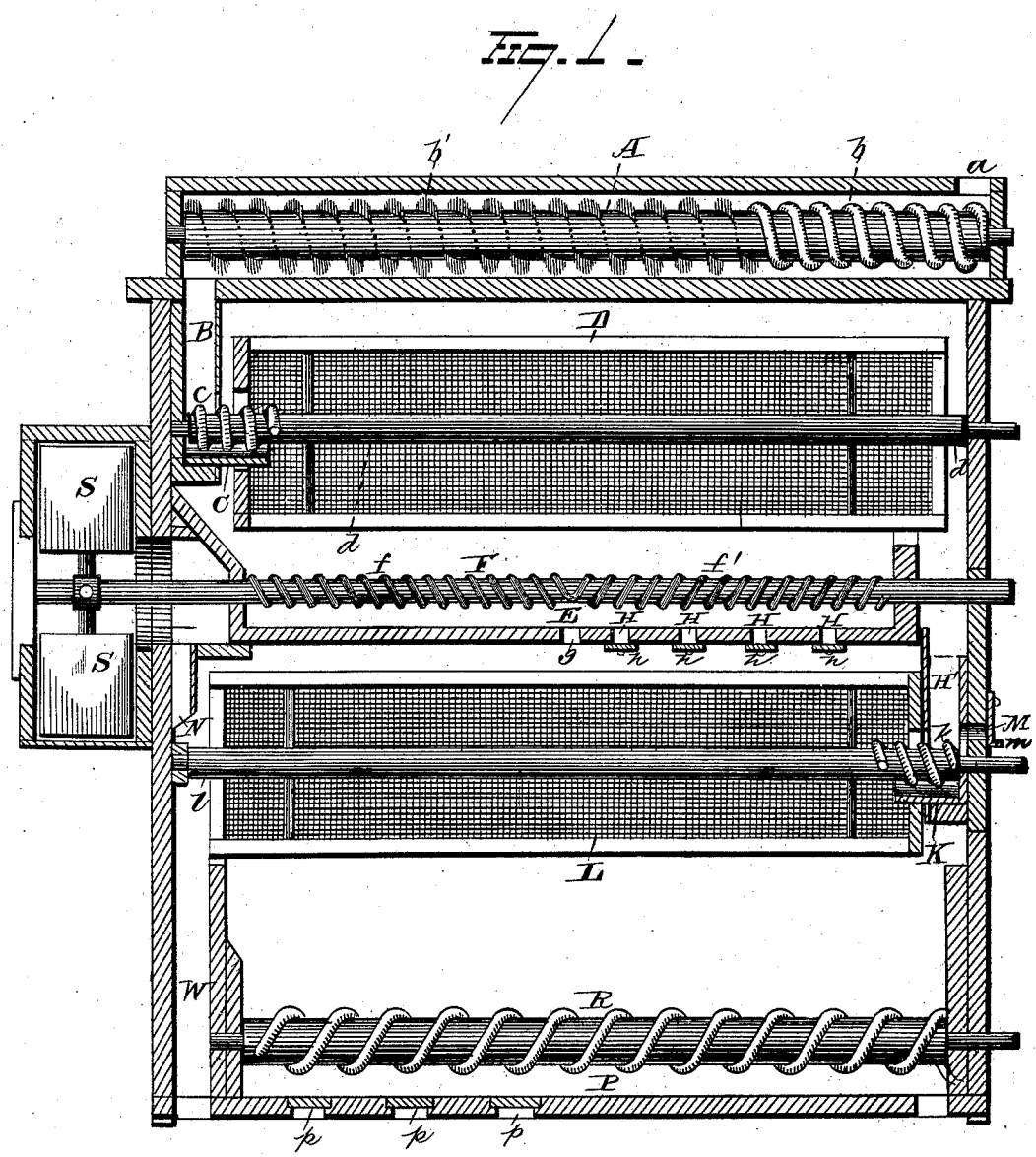
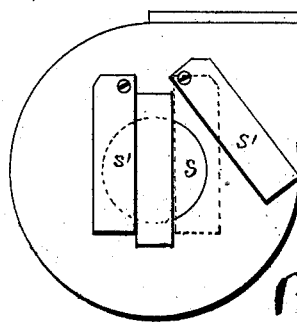
WITNESSES
E. T. Nottingham
Geo. D. Seymour.
INVENTOR
Chauncey F. Keller,
By H. A. Seymour,
ATTORNEY C. F. KELLER.
Middlings Separator.

No. 216,333. Patented June 10, 1879.

WITNESSES
E. I. Nottingham
Geo. D. Seymour

INVENTOR
Chauncey F. Keller.
By H. A. Seymour.
ATTORNEY

UNITED STATES PATENT OFFICE.

CHAUNCY F. KELLER, OF LIMA, OHIO.

IMPROVEMENT IN MIDDLINGS-SEPARATORS.

Specification forming part of Letters Patent No. 216,333, dated June 10, 1879; application filed November 27, 1878.

*To all whom it may concern:*

Be it known that I, CHAUNCY F. KELLER, of Lima, in the county of Allen and State of Ohio, have invented certain new and useful Improvements in Middlings-Separators; and I do hereby declare the following to be a full, clear, and exact description of the invention, such as will enable others skilled in the art to which it pertains to make and use it, reference being had to the accompanying drawings, which form part of this specification.

My invention relates to middlings-separators; and is designed to provide a simple and efficient machine for accomplishing in an improved manner a result as follows: The fine flour is first dusted from the coarse middlings, prior to the passage of the same into the first operating-reel. After the whole is introduced into said first reel, the fine flour is discharged from the machine, while the coarse middlings pass down into a second reel. This latter reel is not set on an inclination, so as to have a fall which carries the middlings through the same; but while it is hung so as to be perfectly horizontal, the middlings are carried through it by means of a gentle air-suction.

In order to well purify the middlings from the fine fuzzy matter associated therewith, two suction-chambers are formed, one on each side of the machine and extending the length thereof, the construction and connections of the same being such as to cause a draft of air entering at the bottom of the machine to pass up through the falling middlings, and finally out through the fan-chamber, thereby taking with said draft such matter as should be separated from the middlings.

With this end in view, my invention consists, first, in the combination, with an upper reel and intermediate communication, of a conveyer located above the same, and formed in that portion of its length contiguous to the reel communication with a flexible spiral, while the remaining portion of its length is formed with a rigid spiral; second, in the combination, with an upper reel and intermediate communication, of a conveyer located above the same, and formed in its head portion with a wire spiral, the central and tail portions thereof being formed with a brush spiral, said wire portion being adapted to break the dough balls or hunky middlings, while said brush portion is adapted to dust the fine flour from the middlings; third, in the combination, with the hopper which discharges the middlings from the upper reel into the lower reel, and is provided with an opening and valve, of the spout and short conveyer connecting the same with the lower reel, which latter is journaled in true horizontal line, together with the vertical passage formed between the opposite end of said lower reel and the fan-chamber located above the same; fourth, in the combination, with a fan-chamber, of a side suction-chamber, with which the same communicates, said suction-chamber being formed with upper and lower longitudinal triangular divisions, the lower division communicating with the space or chamber below the same, and in which the lower reel operates; fifth, in the combination, with the fan-chamber, of a side suction-chamber communicating therewith and formed with a longitudinal upper division, whose lower side or wall extends from said fan-chamber at an inclination upwardly and forwardly toward the front end of the machine, while the longitudinal lower division is subdivided into transverse vertical passages adapted to divide and regulate the draft in its passage from the lower reel chamber or space into said upper division of the suction-chamber; sixth, in the combination, with the fan-chamber, of a side suction-chamber communicating therewith, and formed with both an upper and a lower longitudinal triangular division, said lower division having communication with a chamber below the same, in which the second reel operates, and through which an air-current passes, while said upper division has direct communication with the atmosphere by means of valve-openings and valves in any suitable number; seventh, in the combination, with the upper conveyer-chamber, formed in its lower portion with one or more openings, provided with suitable valves, of the reel located below the same, and mechanism adapted to produce an upward air-current through the chamber in which the reel operates, whereby said reel may serve as a spreading device.

Figure 3:
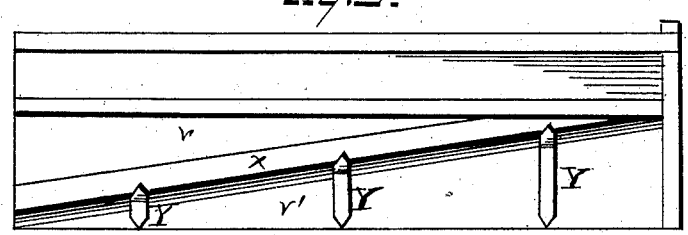

Referring to the drawings, Figure 1 is a view, in longitudinal vertical section, of a machine embodying the invention. Fig. 2 is a view, in transverse vertical section, through the middle of the machine, and showing a portion of the rear or fan end of the machine in interior end elevation. Fig. 3 is a detail view, representing an interior side elevation of the inner wall of one of the suction-chambers.

The conveyer A, located longitudinally on the top of the machine, is formed with that portion of its length which is contiguous to the feed-opening $a$ made with a rigid spiral. The remaining portion of its length is made with a flexible spiral, the result of the same being that the rigid spiral breaks up the dough balls or lumpy middlings, while the flexible spiral dusts the fine flour from the coarse middlings. In this instance a wire spiral, $b$, is used as the rigid part at the head portion of the conveyer, while a brush spiral, $b'$, is used as the central and tail portions of the same. A hopper, B, provides communication between the tail end of said conveyer and the spout C, which latter, together with the short conveyer $c$, discharges the raw middlings into the upper reel, D. This short conveyer is in spiral form about the shaft $d$ of said reel, and is rigidly connected therewith, so as to be actuated in rotary movement by the same. Suitable bolt-covering is used with both this upper and lower reel. As the fine flour is dusted through the covering of the upper reel, the same falls down into the upper conveyer-chamber, E, and is there acted upon by the conveyer F. This latter conveyer is formed with two reverse spirals, $f f'$, extending from its central length, respectively, to both extremities thereof. As the conveyer is rotated, its action carries the final flour from both ends of the conveyer or chamber to the central discharge-opening, $g$, from which it passes out from the machine through discharge-spout G.

Such portion of the fine middlings as may be too sharp, and hence requires to be reground, is passed from out the conveyer-chamber through valve-openings H, one or more, said openings being provided with suitable valves $h$. As said middlings pass through these openings or cut-offs they are subjected to the upward current of air, which is on its way to the side suction-chambers; hence, as they fall upon the exterior side of the lower reel, they are well purified from objectionable light matter. The coarse middlings pass horizontally through the length of the upper reel, then down through hopper H′, and, by means of spout K and short conveyer $k$, they are carried into the second or lower reel, L. This last conveyer is formed as a spiral about the shaft $l$ of the lower reel, and is rigidly secured thereto, so as to be actuated in rotary movement by the same. Communication is made between the outer air and this latter hopper, so as to permit outside air directly therein. A valve-opening, M, and valve $m$ are formed for this purpose, and control the current of air, which is thus caused to pass therefrom through the length of the lower reel, and, finally, up into the fan-chamber through pipe N. The middlings are in this manner carried through the reel on a gentle air-current, just sufficient for the end in view, and thus all necessity for setting said reel at a longitudinal angular inclination or fall is obviated.

It will be observed that the reel L also serves as a spreading device in its combination with the upper conveyer-chamber, both the same being formed and adapted to fulfill their respective functions as previously set forth.

The lower conveyer-chamber, P, in which conveyer R operates, is provided at its bottom with valves or cut-offs $p$, which permit of separation of the middlings as desired. The suction-fan S works within a chamber formed with openings $s$, one or more, suitably provided with covers $s'$, whereby the draft of the fan is regulated.

Slots or longitudinal openings T are formed in the lower portion of the sides of conveyer-chamber P, which permit the passage of outer air into said chamber in the same horizontal plane with or a little above the lower conveyer. From this point the air passes up into the machine through the falling middlings, and carrying with it objectionable fine matter, which together enter the fan-chamber through the side suction-chambers, U. The offal is carried out through passage W and discharged from the machine.

The side suction-chambers are located one on each side of the machine, just above the lower reel, and are respectively made with two longitudinal divisions, $v$ and $v'$. These divisions are in each chamber, in alternate triangular form, the upper one, $v$, having its end of greatest width in communication with the fan-chamber, while the lower one, $v'$, has its end of greatest width at the opposite end of the machine. These triangular divisions are made by means of angularly-inclined cleats or projecting ribs $x$, formed respectively on the inner side of the two longitudinal walls of each chamber, said cleats or ribs extending from the lower portion of the chamber, at the fan end thereof, at an upward inclination to the opposite end of the same.

In order to divide and regulate the draft within said suction-chambers, vertical transverse cleats or ribs Y are formed, in any desired number, within the lower division of each chamber. As the air-current passes from below up into said chambers, these vertical cleats or ribs constitute transverse partitions, and provide suitable draft at all points of the length of the machine. Preferably said longitudinal cleats or ribs are formed with beveled sides, the upper side being beveled to a greater width than the lower side, such construction best effecting the end in view.

Valve-openings Z, in any desired number, and provided with suitable valves $z$, permit outside air to be taken directly into the upper division of each of the suction-chambers, and thus aid in securing the required draft, as desired.

Having fully described my invention, what I claim as new, and desire to secure by Letters Patent, is—

1. In a middlings-separator, the combination, with an upper reel and intermediate communication, of a conveyer located above the same, and formed in that portion of its length contiguous to the reel communication with a flexible spiral, while the remaining portion of its length is formed with a rigid spiral, substantially as set forth.

2. In a middlings-separator, the combination, with an upper reel and intermediate communication, of a conveyer located above the same, and formed in its head portion with a wire spiral, the central and tail portions thereof being formed with a brush spiral, said wire portion being adapted to break the "dough balls," while said brush portion is adapted to dust the fine flour from the middlings, substantially as set forth.

3. The combination, with the hopper which discharges the middlings from the upper reel into the lower reel, and is provided with an air-opening and valve, of the spout and short conveyer connecting the same with the lower reel, which latter is journaled in true horizontal line, together with the vertical passage formed between the opposite end of said lower reel and the fan-chamber located above the same, substantially as set forth.

4. In a middlings-separator, the combination, with a fan-chamber, of a side suction-chamber, with which the same communicates, said suction-chamber being formed with upper and lower longitudinal triangular divisions, the lower division communicating with the space or chamber below the same, and in which the lower reel operates, substantially as set forth.

5. In a middlings-separator, the combination, with the fan-chamber, of a side suction-chamber communicating therewith, and formed with a longitudinal upper division, whose lower side or wall extends from said fan-chamber at an inclination upwardly and forwardly toward the front end of the machine, while the longitudinal lower division is subdivided into transverse vertical passages, adapted to divide and regulate the draft in its passage from the lower reel chamber or space into said upper division of the suction-chamber, substantially as set forth.

6. The combination, with the fan-chamber, of a side suction-chamber communicating therewith, and formed with both an upper and a lower longitudinal triangular division, said lower division having communication with a chamber below the same, in which the second reel operates, and through which an air-current passes, while said upper division has direct communication with the atmosphere by means of valve-openings and valves in any suitable number, substantially as set forth.

7. The combination, with the upper conveyer-chamber, formed in its lower portion with one or more openings provided with suitable valves, of the reel located below the same, and mechanism adapted to produce an upward air-current through the chamber in which the reel operates, whereby said reel may serve as a spreading device, substantially as set forth.

In testimony that I claim the foregoing I have hereunto set my hand this 19th day of November, 1878.

CHAUNCY F. KELLER.

Witnesses:
LEVI HEIPLE,
WM. M. BATES.